United States Patent
Raleigh et al.

(10) Patent No.: US 6,795,426 B1
(45) Date of Patent: Sep. 21, 2004

(54) REALTIME POWER CONTROL IN OFDM SYSTEMS

(75) Inventors: Gregory G. Raleigh, Woodside, CA (US); Ali Raissinia, Monte Sereno, CA (US); Vincent K. Jones, IV, Redwood City, CA (US); Michael Pollack, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 638 days.

(21) Appl. No.: 09/603,237

(22) Filed: Jun. 23, 2000

Related U.S. Application Data (63) Continuation of application No. 09/348,644, filed on Jul. 6, 1999, now abandoned.

(51) Int. Cl.[7] .................................................. H04J 3/00
(52) U.S. Cl. ........................ 370/345; 370/252; 370/210
(58) Field of Search ................................ 370/331, 345, 370/241, 280, 329, 252, 448, 210; 725/129, 124; 324/620, 76.21; 375/224; 455/69, 423, 455; 341/139

(56) References Cited

U.S. PATENT DOCUMENTS

| | | | |
|---|---|---|---|
| 5,056,109 A | 10/1991 | Gilhousen et al. | 370/342 |
| 5,465,398 A | 11/1995 | Flammer | 455/69 |
| 5,697,053 A | 12/1997 | Hanly | 375/130 |
| 5,812,938 A | 9/1998 | Gilhousen et al. | 455/69 |
| 5,884,187 A | 3/1999 | Ziv et al. | 455/522 |
| 5,995,496 A | 11/1999 | Honkasalo et al. | 370/318 |

OTHER PUBLICATIONS

"Data–over–cable services interface specifications", 1997, Radio Frequency Interface Specification, Cable Television Laboratories. (In Parent Case).

*Primary Examiner*—John Pezzlo
(74) *Attorney, Agent, or Firm*—Ritter, Lang & Kaplan LLP (57) ABSTRACT

Systems and methods for efficiently transmitting power level information in a point to multipoint wireless system. Multiple subscriber units may transmit indications of their power level within a shared burst where one or more subchannels are allocated to each subscriber unit. The burst holding the power level information may be understood by the MAC layer to be a data burst. In this way, a wireline MAC protocol may be applied to wireless applications.

15 Claims, 6 Drawing Sheets

REALTIME POWER CONTROL IN OFDM SYSTEMS

STATEMENT OF RELATED APPLICATIONS

The present application is a continuation of U.S. application Ser. No. 09/348,644 filed Jul. 6, 1999, now abandoned which is hereby incorporated by reference in its entirety.

U.S. patent application Ser. No. 09/348,647, filed Jul. 6, 1999, entitled COMMUNICATION OF PHYSICAL LAYER CONTROL PARAMETERS;

U.S. patent application Ser. No. 09/348,719, filed Jul. 6, 1999, entitled POWER REGULATION USING MULTI-LOOP CONTROL;

U.S. patent application Ser. No. 09/348,645, filed Jul. 6, 1999, entitled OPTIMAL USE OF REQUEST ACCESS TDMA SLOTS FOR AUTOMATIC LEVEL CONTROL;

U.S. patent application Ser. No. 09/348,727, filed Jul. 6, 1999, entitled POLLING FOR TRANSMISSION POWER CONTROL.

The present application is also related to the subject matter of U.S. application Ser. No. 09/019,938, filed Feb. 6, 1998, titled MEDIUM ACCESS CONTROL PROTOCOL FOR OFDM WIRELESS NETWORKS.

All of the related applications are incorporated by reference herein for all purposes.

BACKGROUND OF THE INVENTION

The present invention relates to communications systems and more particularly to systems and methods for power control in communication systems that employ orthogonal frequency division multiplexing or OFDM.

A point to multipoint wireless communication system represents a potentially effective solution to the problem of providing broadband network connectivity to a large number of geographically distributed points. Unlike optical fiber, DSL, and cable modems, there is no need to either construct a new wired infrastructure or substantially modify a wired infrastructure that has been constructed for a different purpose.

In order to conserve scarce spectrum, the data communication devices of a point to multipoint wireless communication system may share access to a common frequency. In a typical scenario one or more frequency channels are allocated to downstream broadcast communication from a central access point to a plurality of subscriber units and one or more separate frequency channels are allocated to upstream communication from the subscriber units to the central access point. For upstream communication, there is a medium access control (MAC) protocol which schedules subscriber unit transmissions to prevent interference.

For a given upstream frequency, the time domain is divided into frames which are typically of equal duration. Each frame represents an individually allocable unit in the time domain. One subscriber unit transmits in each frame. Reservations for transmission in a particular frame are made by the central access point and distributed in broadcast downstream transmissions in accordance with the MAC protocol.

In such a point to multipoint wireless communication system, it is generally preferable to centrally control the transmission power of each subscriber unit. Each subscriber unit should transmit at a power level high enough to assure accurate reception of the transmission yet not so high as to swamp the front end of the central access point's receiver or cause interference to unintended receivers. Power control involves monitoring subscriber unit transmitted power at the central access point and sending power adjustment information downstream to maintain power at the desired level.

Cable modem systems also have a point to multipoint architecture, also involve access to a shared medium, and also require subscriber unit power control. It would be desirable to simply adopt a MAC protocol already developed for cable applications to the wireless context. One such protocol that has been developed is referred to as the MCNS protocol. The MCNS protocol is described in Data-Over-Cable Service Interface Specifications, Radio Frequency Interface Specification, SP-RFI-I04-980724, (Cable Television Laboratories, 1997), the contents of which are herein incorporated by reference.

A cable MAC protocol like MCNS is already implemented in low cost chip sets. The operational characteristics of MCNS are well known. Hardware and software to implement higher layer protocols is designed to interoperate with MCNS. Furthermore, it is desirable to maintain parts commonality between wireless modems and cable modems to the extent possible.

The MCNS protocol provides for controlling the power of subscriber units from a head end. In the MCNS protocol, subscriber units may be requested by the head end to transmit upstream for the purpose of measuring their power. The head end responds with a downstream power adjustment command. Each upstream power measurement transmission by a subscriber unit requires use of a MAC frame that is then unavailable for data transmission by other subscriber units. Unfortunately, a wireless communication system requires more frequent updates of subscriber unit power level than does a cable modem system. Using the power control features of MCNS to provide sufficiently frequent updates in a wireless system consumes valuable capacity. Furthermore, the frequent update operations are burdensome to hardware implementing the MAC protocol.

OFDM (Orthogonal Frequency Division Multiplexing) is a highly useful communication technique. In OFDM, the available bandwidth is divided into subchannels that are orthogonal to one another in the frequency domain. A high data rate signal is effectively transmitted as a set of parallel low data rate signals, each one being carried over a separate subchannel. OFDM addresses a problem known as multipath caused by differences in delay time among different paths taken from a transmitter to a receiver. The effect of multipath is intersymbol interference created by energy associated with different symbols sharing a common arrival time. By creating multiple low data rate subchannels, OFDM lengthens the period occupied by a single symbol so that dispersive effects tend to be confined within a single symbol period, thereby reducing intersymbol interference.

It would be desirable to provide power control functionality to a wireless OFDM point to multipoint communication system and to exploit existing cable modem system MAC protocols to the extent possible.

SUMMARY OF THE INVENTION

Systems and methods for efficiently transmitting power level information in a point to multipoint wireless system are provided by virtue of the present invention. In one embodiment, multiple subscriber units transmit indications of their power level within a shared burst where one or more subchannels are allocated to each subscriber unit. In one embodiment, the burst holding the power level information is understood by the MAC layer to be a data burst. In this way, a wireline MAC protocol may be applied to wireless applications.

A first aspect of the present invention provides apparatus for operating a selected node of a communication system. The apparatus includes: a power measurement burst generator that develops a burst of L frequency domain symbols wherein L-k frequency domain symbols are given a zero value and are reserved for transmission by other nodes and one or more of k of the L frequency domain symbols are set to facilitate measurement of power level, a transform block that converts the burst of frequency domain symbols into a time domain burst of symbols, and a transmitter system that transmits the time domain burst of symbols from the selected node as a power measurement burst.

A second aspect of the present invention provides apparatus for operating a central access point of a point to multipoint communication system. The apparatus includes: a receiver system that receives a time domain power transmission burst, a transform block that converts the time domain power transmission burst to a frequency domain burst of frequency domain symbols, and a power measurement processor that uses a first set of one or more frequency domain symbols of the burst to measure power transmitted by a first subscriber unit and uses a second set of one or more frequency domain symbols to measure power transmitted by a second subscriber unit.

A further understanding of the nature and advantages of the inventions herein may be realized by reference to the remaining portions of the specification and the attached drawings.

DESCRIPTION OF SPECIFIC EMBODIMENTS

Figure 1:
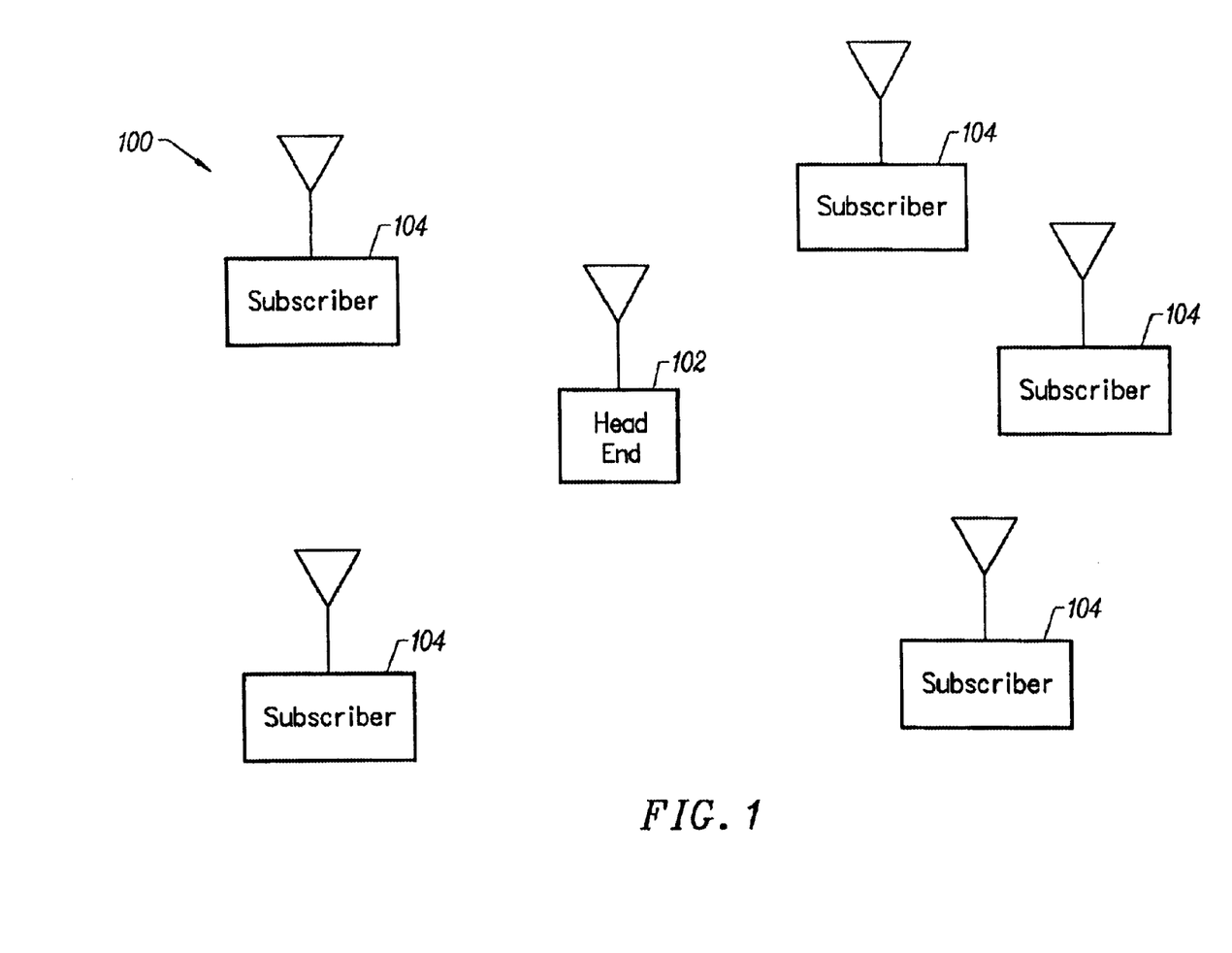
FIG. 1 depicts a point to multipoint wireless communication network

FIG. 1 depicts a point to multipoint wireless communication network 100 suitable for implementing one embodiment of the present invention. Network 100 includes a central access point or head end 102 and multiple subscriber units 104. All communication is either to or from central access point 102. Communication from head end 102 to one or more of subscriber units 104 is herein referred to as downstream communication. Communication from any one of subscriber units 104 to head end 102 is herein referred to as upstream communication. In one embodiment, different frequencies are allocated to upstream and downstream communication. In another embodiment, time division duplexing (TDD) is employed wherein upstream and downstream communication may share one or more frequencies. In other alternate embodiments, subscriber units 104 may communicate directly with one another.

Each of one or more upstream frequencies is common to multiple subscriber units. To prevent collisions between subscriber units in accessing the shared medium, a medium access control (MAC) protocol is provided. According to one embodiment of the present invention, a MAC protocol intended for data transmission over cable systems is used to coordinate upstream communications in wireless network 100. An exemplary MAC protocol of this type is the so-called MCNS protocol described in Data-Over-Cable Service Interface Specifications, Radio Frequency Interface Specification, SP-RFI-I04-980724, (Cable Television Laboratories, 1997), the contents of which are herein incorporated by reference.

MCNS employs a time domain multiple access (TDMA) scheme to allocate access to the shared upstream frequency among the multiple subscriber units 104. The scheme is a so-called reservation scheme where subscriber units 104 make requests to central access point 102. Central access point 102 responds by broadcasting a schedule of when each subscriber unit is authorized to transmit. For purposes of this allocation, time is divided into frames with each frame being an allocable unit of time.

The entities controlling operation according to the MAC protocol at the central access point 102 and at subscriber units 104 are often referred to collectively as the MAC layer. This identifies these entities as collectively representing a layer in a multi-layer communication model. In reference to the well-known OSI multilayer model of data communication, the MAC layer as is discussed here may be understood to be a lowest sublayer of the data link layer. Underneath the MAC layer is the physical layer which is here responsible for transmitting and receiving bits over the wireless channel.

The MAC layer implements a time domain multiple access (TDMA) scheme for upstream communication. Each of one or more upstream frequencies is divided into a series of frames or minislots in the time domain. In MCNS, there are frames allocated to data, frames allocated to requests for access to the medium, frames allocated to system maintenance, and frames allocated to initial maintenance.

According to the present invention, certain frames viewed by the MCNS protocol layer as data frames may be used to transmit power management information from subscriber units 104 to central access point 102. The present invention may take advantage of OFDM techniques to allow multiple subscriber units to simultaneously transmit power information in a single frame.

The present invention is described in the context of the use of OFDM (Orthogonal Frequency Division Multiplexing) for communication of data, although the present invention may be applied to systems that do not apply OFDM for data transmission but rather only to transmission of power measurement information. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an IFFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \mapsto [z(N-v+1) \ldots z(N) \, z(1) \ldots z(N)]^T$$

On the receive end, the cyclic prefix is removed from the received time domain symbols. An FFT is then applied to recover the simultaneously transmitted frequency domain symbols. The cyclic prefix has length v where v is greater than or equal to a duration of the impulse response of the overall channel and assures orthogonality of the frequency domain subchannels.

There are other ways of simultaneously transmitting a burst of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels. The term frequency domain should be understood to refer to any domain that is divided into such orthogonal or substantially orthogonal subchannels.

Figure 2A:
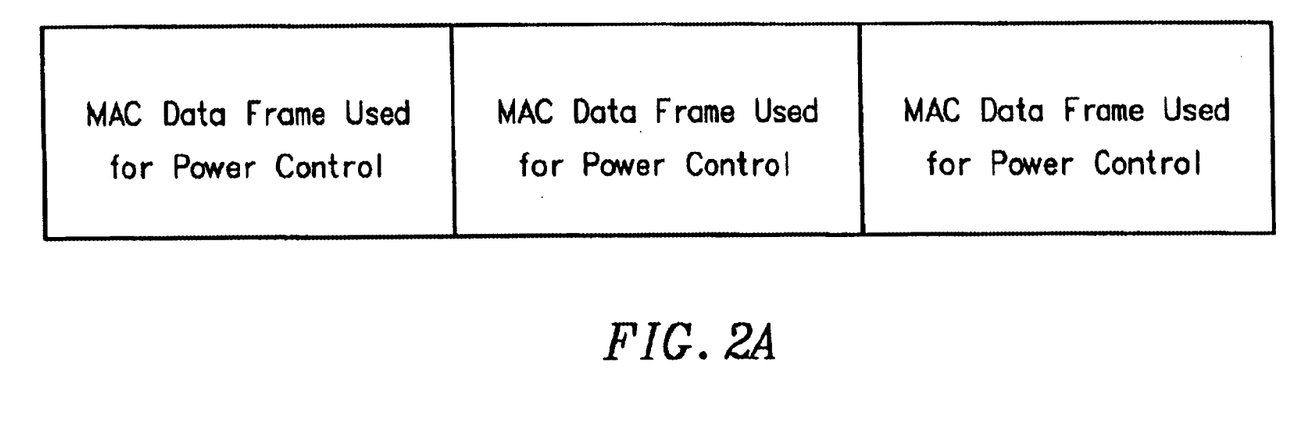
FIG. 2A depicts a series of MAC frames for carrying upstream power measurement information according to one embodiment of the present invention.

FIG. 2A depicts a series of 3 MAC frames that are allocated by the MCNS layer to data transmission but may be used for upstream power management. By employing OFDM techniques, each of the 3 MAC frames may carry upstream power management information for 8 different subscriber units.

Figure 2B:
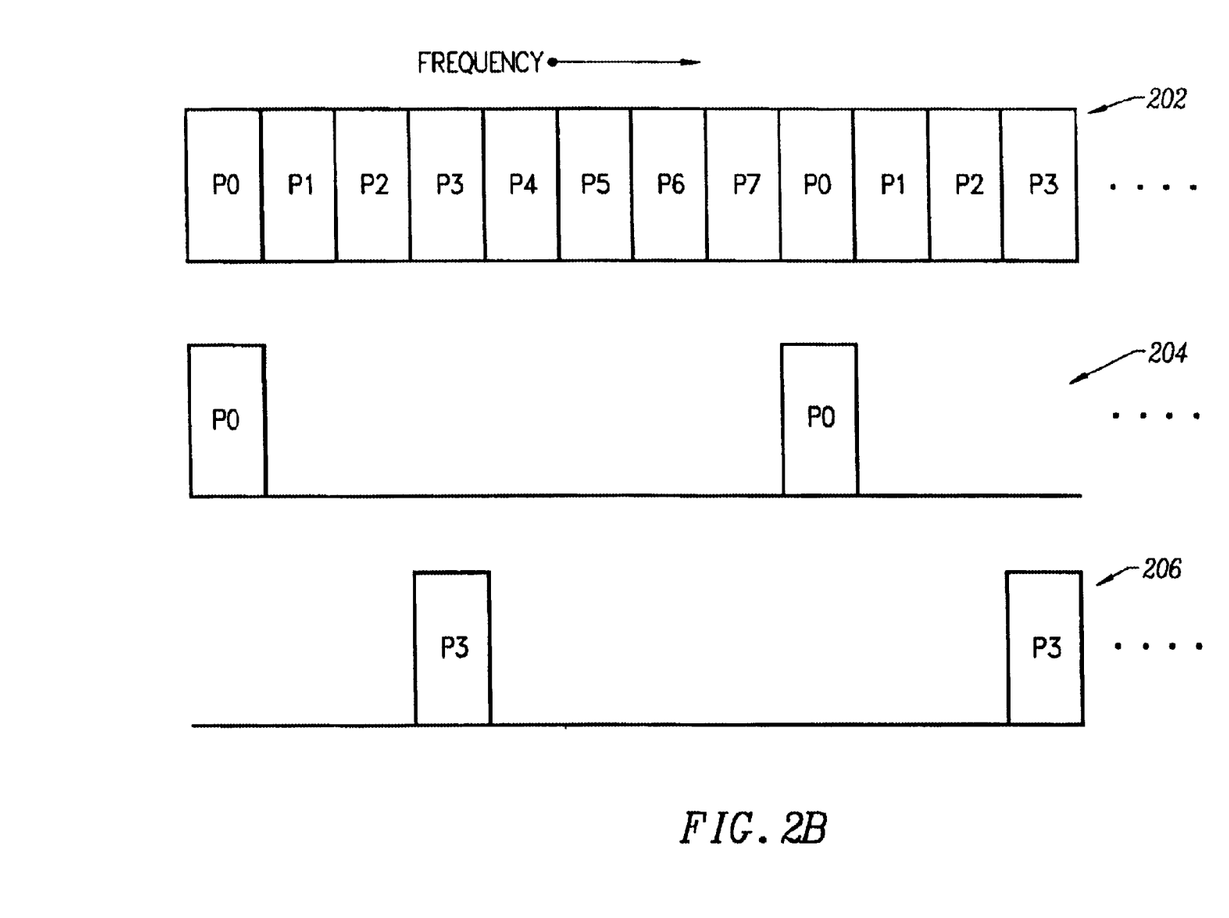
FIG. 2B depicts a frequency domain representation of an OFDM burst carrying power measurement information according to one embodiment of the present invention.

FIG. 2B is a frequency domain representation of a single MAC frame used to transmit power measurement information. For convenience of illustration, only a portion of the spectrum is depicted. A first diagram 202 shows the contributions of eight different subscriber units depicted as P0, P1, P2, . . . etc. A second diagram 204 shows the frequency domain contribution of subscriber unit 0 in isolation. A third diagram 206 shows the frequency domain contribution of subscriber unit 3 in isolation. Each rectangular slice represents a single symbol in the frequency domain. A single MAC frame corresponds to a single OFDM burst.

If there are N frequency domain symbols in an OFDM burst, each subscriber unit transmits v frequency domain symbols of the burst where v is greater than or equal to a maximum expected duration of the impulse response from each subscriber unit to the central access point as measured in symbol periods. The v symbols have predetermined values to facilitate adjustment of subscriber unit output power.

At the subscriber unit, frequency domain symbols not allocated to that subscriber unit are set to zero. The frequency domain burst including v non-zero symbols is transformed into the time domain at each subscriber unit and the cyclic prefix is added appropriately prior to transmission. Central access point 102 receives a summed time domain burst including the summed cyclic prefixes. Central access point 102 removes the summed cyclic prefix values and converts the remaining time domain symbols to the frequency domain to retrieve the power measurement symbols for each of the eight subscriber units.

In the system described herein, all communications from subscriber units 104 to central access point 102 employ OFDM techniques. The present invention, however, also contemplates using OFDM only for certain types of communications including upstream transmission of the power measurement burst.

Figure 3A:
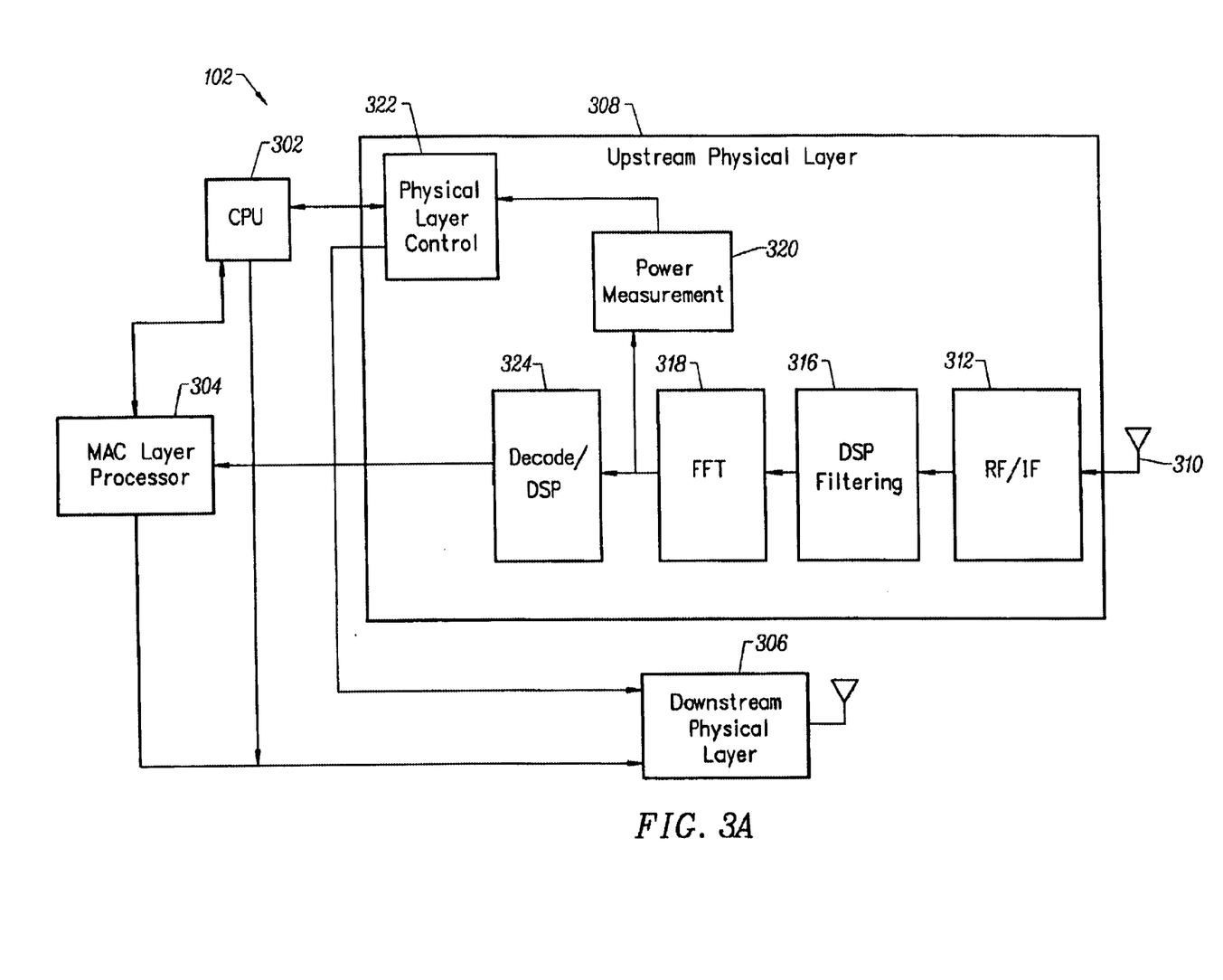
FIG. 3A depicts elements of a central access point according to one embodiment of the present invention.

FIG. 3A is a diagram of elements of central access point 102. A CPU 302 performs overall system control. A MAC layer processor 304 implements the headend operation of the MAC protocol for both the upstream and downstream directions. Besides coordinating MAC layer operation, MAC layer processor 304 also acts as the interface in relaying data to and from higher layer entities at the central access point. In MCNS applications, headend MAC layer processor 304 may be a BCM3210B integrated circuit available from Broadcom, Inc. of Irvine, Calif.

A downstream physical layer block 306 implements signal processing and RF signal handling for communication from central access point 102 to all of the subscriber units. Although there is no medium contention in the downstream channel, communication is nonetheless under the control of MAC layer processor 304. Details of downstream communication in a point to multipoint system are discussed in the patent application entitled COMMUNICATION OF PHYSICAL LAYER CONTROL PARAMETERS, the contents of which are herein incorporated by reference.

An upstream physical layer block 308 performs receiver signal processing and RF signal handling for an upstream channel. FIG. 3A depicts an upstream physical layer block for a single upstream channel but block 308 may of course be duplicated for multiple upstream frequencies.

Within upstream physical layer block 308, upstream signals are received via an antenna 310 and processed by an RF/IF block 312 which performs filtering at the RF frequency and low noise preamplification. RF/IF block 312 also downconverts the RF signal to an IF frequency, filters at the IF frequency, downconverts the IF signal to baseband, and converts the analog baseband signal to a sequence of digital samples. Further signal processing is performed by a DSP/filtering block 316. The baseband signal processed by DSP/filtering block 316 is still in the time domain. An FFT block 318 converts the time domain signal to the frequency domain on a burst-by-burst basis.

Certain frequency domain bursts will have been allocated for upstream power measurement bursts. CPU 302 informs physical layer control processor 322 of the scheduled times of the power measurement bursts. These bursts will be processed by a power measurement processor 320 which will measure received power for the various subscriber units sharing each burst. The measurements are forwarded to a physical layer control processor 322 which develops power adjustment information to send to the individual subscriber units. In one embodiment, the power adjustment information is sent from physical layer control processor 322 to downstream physical layer control block 306. Physical layer control processor 322 may be integrated with downstream physical layer control processing hardware within downstream physical layer block 306. Power adjustment techniques are described in greater detail in the patent application entitled POWER REGULATION USING MULTI-LOOP CONTROL.

Non-power measurement bursts are processed by a decoding block 324 which removes error correction coding such as convolutional coding, Reed-Solomon coding, trellis coding, etc. Decoding block 324 forwards its output data to MAC layer processor 304 including MAC management data and data destined for higher layer entities or applications.

Figure 3B:
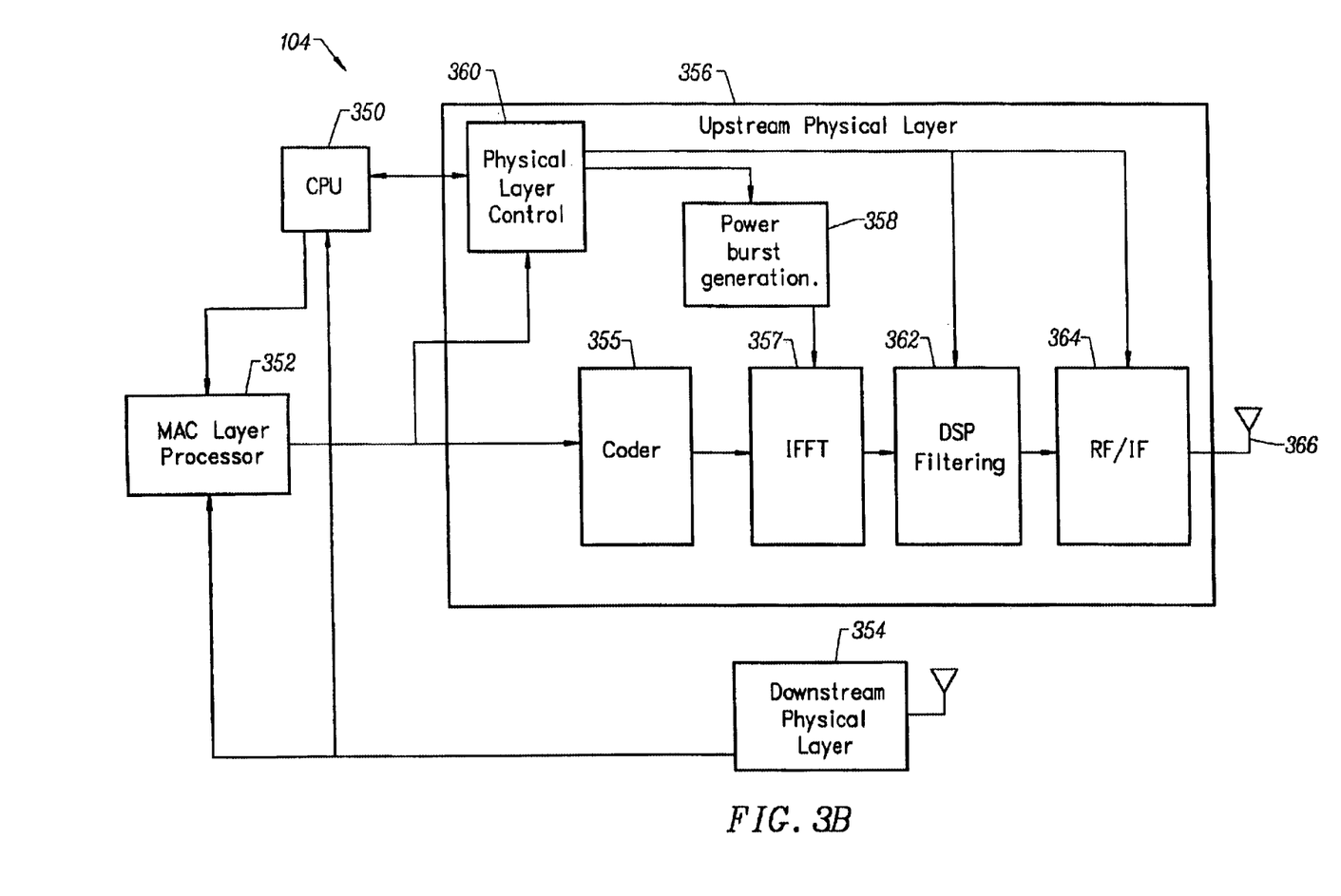
FIG. 3B depicts elements of a subscriber unit according to one embodiment of the present invention.

FIG. 3B is a simplified hardware diagram of elements of a representative one of subscriber units 104. A CPU 350 controls overall operation. A MAC layer processor 352 implements subscriber unit operation of the MAC protocol for both upstream and downstream directions and acts as a data interface to higher layers. In MCNS applications, subscriber unit MAC layer processor 352 may be a BCM3300 integrated circuit provided by Broadcom. A downstream physical layer block 354 receives downstream signals from central access point 102 and relays received data to MAC layer processor 352 and CPU 350.

An upstream physical layer block 356 performs transmitter signal processing and RF signal handling for upstream communication to central access point 102. Upstream physical layer block 356 transmits at times designated by MAC layer processor 352 according to the operative MAC protocol. MAC management data and other data from higher layers is input to a coder 355 which performs error correction coding such as convolutional coding, Reed-Solomon coding, trellis coding, etc. Time domain symbols output by coder 355 are converted to the frequency domain on a burst-by-burst basis by an IFFT block 357.

Some bursts are provided by a power measurement burst generation block 358. Power measurement burst generation block 358 generates frequency domain bursts where all but a group of symbols allocated to the particular subscriber unit are set to zero. These power measurement bursts are also converted to the time domain by IFFT block 357.

A DSP/filtering block 362 performs further baseband signal processing. An RF/IF block 364 converts the baseband signal to analog, converts the analog signal to an IF frequency, filters the IF signal, converts the IF signal to an RF frequency, and amplifies the RF signal for transmission via an antenna 366. Physical layer control processor 360 may react to the power adjustment information it receives by adjusting a digital scaling factor within DSP/filtering block 362, adjusting an IF amplification level within RF/IF block 364, adjusting an RF amplification level within RF/IF block 364, or any combination of these.

Figure 4A:
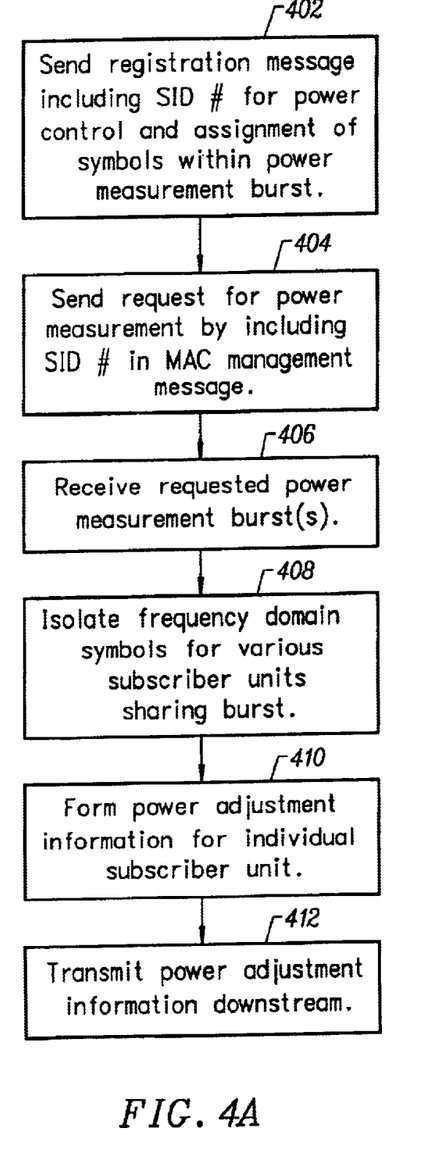
FIG. 4A is a flowchart describing steps of operating a central access point according to one embodiment of the present invention.

FIG. 4A is a flowchart describing steps of operation of central access point 102. At step 402, central access point 102 sends a registration message downstream to a particular one of subscriber units 104. The registration message includes information that will help the subscriber unit know when it is expected to transmit power measurement information upstream to central access point 102. The registration message is transmitted via the downstream physical layer under the direction of CPU 302.

In an MCNS implementation, a so-called SID (subscriber ID) number identifies a subscriber unit upstream data source. Each subscriber unit may have one or more associated SIDs. For example, one SID may identify realtime voice data from the subscriber unit and another SID may identify latency-tolerant data. Downstream MCNS management messages then grant access to particular frames by specifying the SID numbers that should transmit in those frames.

According to the present invention, certain SID numbers may be reserved to specify requests for transmission of power control information. Each SID number specifies a request for transmission of power control information from a group of multiple subscriber units. For example for the time domain and frequency domain structures shown in FIGS. 2A–2B, one SID number may be assigned to 24 subscriber units to request a power measurement. The use of one SID number for multiple subscriber units greatly reduces the processing burden on CPU 302. The registration message tells the subscriber unit which SID to listen for to know when to transmit a power measurement burst. The registration message further informs the subscriber unit which of the three MAC frames shown in FIG. 2A in which to transmit and which of the eight groups of frequency domain symbols to use within the burst to be transmitted in the assigned MAC frame. In one embodiment, a mini-slot identifier (MSID) identifies the frame (0, 1, or 2) in which to transmit and a tone set identifier (TSID) identifies which of the groups of frequency domain symbols to employ (0, 1, ... 7).

Step 402 will repeat for every newly registered subscriber unit. Step 404 represents a request for upstream power measurement bursts from a group of subscriber units specified by a single SID. In one embodiment, from the perspective of MAC layer processor 304, this request is a conventional MAC grant of a particular frame for upstream data transmission. CPU 302 causes these requests to be generated sufficiently frequently to maintain accurate power control of all registered subscriber units.

At step 406, upstream physical layer block 308 receives the three power measurement bursts at the time specified in the request of step 404. Data from these power measurement bursts need not be passed onto MAC layer processor 304. Instead, the frequency domain symbols of the bursts are passed onto power measurement processor 320. At step 408, power measurement processor 320 isolates the frequency domain symbols corresponding to each of the 24 subscriber units and measures their power based on symbol magnitude. At step 410, physical layer control processor 322 generates power adjustment information for each of the subscriber units. The generation of power adjustment information is described in the patent application entitled POWER REGULATION USING MULTI-LOOP CONTROL. CPU 302 then directs the transmission of the power adjustment information via downstream physical layer 306 at step 412.

Figure 4B:
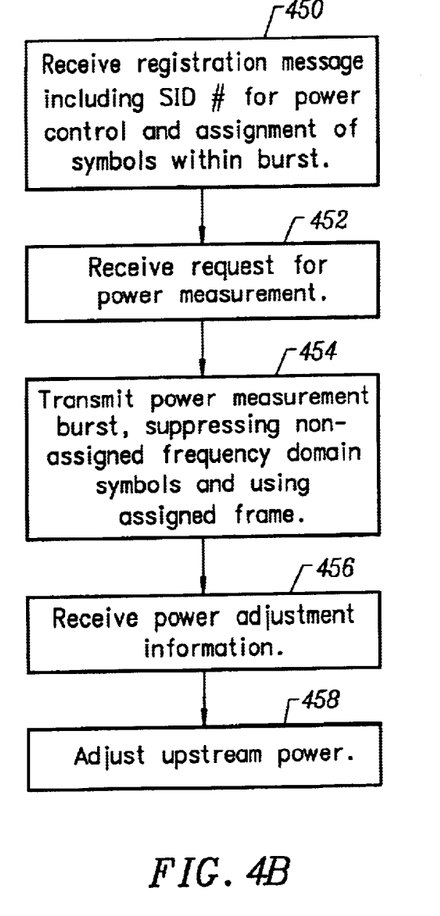
FIG. 4B is a flowchart describing steps of operating a subscriber unit according to one embodiment of the present invention.

FIG. 4B is a flowchart describing steps of operation of a particular one of subscriber units 104 according to one embodiment of the present invention. At step 450, subscriber unit 104 receives the registration message described above from central access point 102. CPU 350 notes the SID to be used to request power measurement burst transmission by subscriber unit 104. CPU 350 also notes the frame in which to transmit and the frequency domain symbol group to use as indicated by the MSID and TSID respectively.

Then at step 452, subscriber unit 104 hears its SID as part of a downstream system management message. MAC layer processor 352 responds by attempting transmission of a data burst at the frame assigned to the subscriber unit at step 454. The data burst as sent to upstream physical layer block 356 includes the MSID value in a header. Physical layer control processor 360, however, detects the MSID value as identifying a power measurement burst and causes any transmission of new data from MAC layer processor 352 to be ignored. Instead, power measurement burst generation block 358 generates a power measurement burst with the appropriate group of v symbols having their predetermined values and the remaining symbols being set to zero value. This burst will be converted to the time domain by IFFT block 357 for transmission over the airwaves.

At step 456, subscriber unit 104 receives power adjustment information from central access point 102 via downstream physical layer block 354. At step 458, physical layer control processor 360 adjusts one or more digital or analog amplification levels in response to the control data received from central access point 102. Details of power adjustment are described in the patent application entitled POWER REGULATION USING MULTI-LOOP CONTROL.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, the present invention may be applied to wireline systems. All publications, patents, and patent applications cited herein are hereby incorporated by reference.

What is claimed is:

1. In a communication system, a method for operating a selected node of said communication system, said method comprising:

receiving from a central access point a transmission comprising a MAC layer identifier to be used to request transmission of a power measurement burst;

receiving a MAC management message comprising said MAC layer identifier;

developing a burst of L frequency domain symbols wherein L-k frequency domain symbols are given a zero value to allow for transmission by other nodes and one or more of said k of said L frequency domain symbols are set to facilitate measurement of power level;

converting said burst of frequency domain symbols into a time domain burst of symbols;

in response to said MAC management message, transmitting said time domain burst of symbols from said selected node as said power measurement burst;

receiving power adjustment information that was developed based on measurement of said power measurement burst; and adjusting transmission power based on said power adjustment information.

2. The method of claim 1 wherein said at least one or more of said L-k frequency domain symbols are reserved for transmission of power measurement information by said other nodes.

3. The method of claim 1 wherein said MAC layer management message identifies said k frequency domain symbols within said burst.

4. The method of claim 1 wherein said MAC layer identifier is used to request transmission from multiple subscriber units.

5. In a communication system, a method for operating a central access point of a point to multipoint communication system, said method comprising:

transmitting a MAC layer management message to first and second subscriber units to request transmission of a time domain power measurement burst, said MAC layer management message comprising MAC layer identifiers referring to said first and second subscriber units;

receiving said time domain power measurement burst at said central access point, said time domain power measurement burst having been transmitted in response to said MAC layer management message;

converting said time domain power measurement burst to a frequency domain burst of frequency domain symbols;

using a first set of one or more frequency domain symbols of said burst to measure power transmitted by said first subscriber unit and using a second set of one or more frequency domain symbols to measure power transmitted by said second subscriber unit;

developing power adjustment information for said first subscriber unit based on measured power of said first subscriber unit;

developing power adjustment information for said second subscriber unit based on measured power of said second subscriber unit;

transmitting said power adjustment information for said first subscriber unit to said first subscriber unit; and transmitting said power adjustment information for said second subscriber unit to said second subscriber unit.

6. The method of claim 5 wherein said MAC layer management message further comprises:

information identifying positions of said first set of one or more frequency domain symbols within said frequency domain burst.

7. The method of claim 5 wherein sending comprises broadcasting to both said first subscriber unit and said second subscriber unit.

8. In a communication system, apparatus for operating a selected node of said communication system, said apparatus comprising:

a power measurement burst generator that develops a burst of L frequency domain symbols wherein L-k frequency domain symbols are given a zero value to allow transmission by other nodes and one or more of said k of said L frequency domain symbols are set to facilitate measurement of power level;

a transform block that converts said burst of frequency domain symbols into a time domain burst of symbols;

a transmitter system that transmits said time domain burst of symbols from said selected node as a power measurement burst;

a receiver system that receives power adjustment information developed based on said power measurement burst;

a physical layer control block that adjust transmission power of said transmitter system based on said power adjustment information; and a central processing unit that receives from a central access point a registration message comprising a MAC layer identifier to be used to request transmission of said power transmission burst, said MAC layer identifier identifying said selected node and other nodes of said communication system;

said central processing unit directing transmission of said power transmission burst in response to a MAC management message comprising said MAC layer identifier.

9. The apparatus of claim 8 wherein said at least one or more of said L-k frequency domain symbols are reserved for transmission of power measurement information by said other nodes.

10. The apparatus of claim 8 wherein a transmission received by said selected node identifies said k frequency domain symbols within said burst.

11. The apparatus of claim 8 wherein at least one of said k frequency domain symbols is set to a predetermined value to facilitate measurement of power level.

12. In a communication system, apparatus for operating a central access point of a point to multipoint communication system, said apparatus comprising:

a receiver system that receives a time domain power measurement burst;

a transform block that converts said time domain power measurement burst to a frequency domain burst of frequency domain symbols;

a power measurement processor that uses a first set of one or more frequency domain symbols of said burst to measure power transmitted by a first subscriber unit and uses a second set of one or more frequency domain symbols to measure power transmitted by a second subscriber unit;

a physical layer control processor that determines first power adjustment information based on said measured power of said first subscriber unit and second power adjustment information based on said measured power of said second subscriber unit; and a transmitter system that sends a MAC layer management message to first and second subscriber units to request transmission of said time domain power measurement burst, said MAC layer management message comprising MAC layer identifiers referring to said first and second subscriber units and sends said first power adjustment information to said first subscriber unit and said second power adjustment information to said second subscriber unit.

13. The apparatus of claim 12 wherein said MAC layer management message comprises:

information identifying positions of said first set of one or more frequency domain symbols within said frequency domain burst.

14. In a communication system, apparatus for operating a selected node of said communication system, said apparatus comprising:

means for receiving from a central access point a transmission comprising a MAC layer identifier to be used to request transmission of a power measurement burst;

means for receiving a MAC management message comprising said MAC layer identifier;

means for developing a burst of L frequency domain symbols wherein L-k frequency domain symbols are given a zero value to allow transmission by other nodes and one or more of said k of said L frequency domain symbols are set to facilitate measurement of power level;

means for converting said burst of frequency domain symbols into a time domain burst of symbols;

means for, in response to said MAC management message, transmitting said time domain burst of symbols from said selected node as a power measurement burst;

means for receiving power adjustment information that was developed based on measurement of said power measurement burst; and means for adjusting transmission power based on said power adjustment information.

15. In a communication system, apparatus for operating a central access point of a point to multipoint communication system, said apparatus comprising:

means for transmitting a MAC layer management message to first and second subscriber units to request transmission of a time domain power measurement burst, said MAC layer management message comprising MAC layer identifiers referring to said first and second subscriber units;

means for receiving said time domain power measurement burst at said central access point, said time domain power measurement burst having been sent in response to said MAC layer management message;

means for converting said time domain power measurement burst to a frequency domain burst of frequency domain symbols;

means for using a first set of one or more frequency domain symbols of said burst to measure power transmitted by said first subscriber unit and using a second set of one or more frequency domain symbols to measure power transmitted by said second subscriber unit; and means for developing power adjustment information for said first subscriber unit based on measured power of said first subscriber unit;

means for developing power adjustment information for said second subscriber unit based on measured power of said second subscriber unit;

means for transmitting said power adjustment information for said first subscriber unit to said first subscriber unit; and means for transmitting said power adjustment information for said second subscriber unit to said second subscriber unit.

* * * * *